UNITED STATES PATENT OFFICE.

VALENTINE SCHMIDT, OF SAN FRANCISCO, CALIFORNIA.

IMPROVEMENT IN VERMIN-EXTERMINATORS.

Specification forming part of Letters Patent No. 168,926, dated October 19, 1875; application filed August 31, 1875.

*To all whom it may concern:*

Be it known that I, VALENTINE SCHMIDT, of San Francisco city and county, State of California, have invented an Animal-Exterminator; and I do hereby declare the following description sufficient to enable any person skilled in the art or science to which it most nearly appertains to make and use my said invention without further invention or experiment.

The object of my invention is to so prepare grain which has been saturated or coated with a poisonous compound, for the purpose of exterminating ground-squirrels and other animals, that it will become a permanent and fixed poison, capable of being transported from place to place, and always be ready for use, and also keep a great length of time without becoming spoiled through must, decomposition, or otherwise.

Heretofore, when poisoned grain has been used for exterminating squirrels and other animals in the field, it was not usually saturated or coated with the poisonous compound until it was needed for use, and then, when still moist or damp, it was distributed in the field. Thus prepared it could never be used as an article of commerce, nor kept any considerable length of time without spoiling.

My invention consists in fixing the poisonous coating or covering upon the grain in a permanent manner, so that it can be packed in cases, tins, or packages, and sold as an article of commerce, and always be ready for use.

To do this, I make a mixture of the poison to be used with finely-pulverized sugar, and intimately mix them by trituration in a mortar, passing the mixture through a fine sieve several times, keeping it dry all the while. The grain to be coated with this poisonous compound I then wash in water, preferably in hot water. I prefer to remove the shell or outer coating of the grain by scouring, but this is not essential. I then pour the dry poisonous mixture upon the grain while it is wet, and if it is warm it is all the better. I then stir the grain, so as to work the mixture all through it. The moisture of the grain partially dissolves the sugar, and causes a coating of the poisonous mixture to be formed around and cover each kernel of the grain. After the grain is coated with the poisonous mixture a small amount of flour should be stirred among the grain, so as to add a thin coating of mixed poison and flour around each kernel. The addition of the flour absorbs a part of the moisture, and makes the kernels less sticky, and assists to conceal the taste. The poisoned grain should then be thoroughly dried, either by natural evaporation or artificial means. If dried by natural evaporation it will take about four days' time, and care must be taken to keep the grain spread thin and frequently stirred. The coated grains can then be packed in tins or other suitable packages and kept for sale, and will not deteriorate by being kept.

I thus produce, as an article of commerce, a poisoned substance which will retain its quality an indefinite length of time, which can be easily handled, and is always ready for use.

Having thus described my invention, what I claim, and desire to secure by Letters Patent, is—

The process herein described of coating grain with a poisonous mixture, consisting of mixing the poison to be used with pulverized sugar and washing the grain in water, then pouring the dry mixture on the wet grain and stirring until the grains are coated with the poisonous mixture, and then coating the poison on each grain with flour, and, lastly, drying by natural evaporation or artificial means, substantially as set forth.

VALENTINE SCHMIDT.

Witnesses:
JOHN L. BOONE,
C. M. RICHARDSON.